United States Patent [19]

Oi

[11] 4,367,267

[45] Jan. 4, 1983

[54] AMORPHOUS LITHIUM FLUOALUMINATE

[75] Inventor: Tetsu Oi, Tokyo, Japan

[73] Assignee: Hitachi, Ltd., Tokyo, Japan

[21] Appl. No.: 257,340

[22] Filed: Apr. 24, 1981

[30] Foreign Application Priority Data

Apr. 25, 1980 [JP] Japan .................................. 55/54159
Nov. 12, 1980 [JP] Japan ................................. 55/158298

[51] Int. Cl.³ ............................................. H01M 6/18
[52] U.S. Cl. .................................... 429/101; 429/191;
429/199; 350/357
[58] Field of Search .................... 429/101, 191, 199;
252/62.6, 408 EC; 361/433; 307/109; 350/357;
204/195 S

[56] References Cited

U.S. PATENT DOCUMENTS 3,764,385 10/1973 Langer, Jr. et al. ................ 429/105
3,989,538 11/1976 Roth et al. .......................... 429/101
4,013,343 3/1977 Jaccard et al. ...................... 350/357
4,287,271 9/1981 Coetzer et al. ..................... 429/199

*Primary Examiner*—Anthony Skapars
*Attorney, Agent, or Firm*—Antonelli, Terry & Wands

[57] ABSTRACT

Disclosed is an amorphous substance represented by the following general formula:

$$aLi_xNa_{1-x}F \cdot bAlF_3$$

wherein a is a mol ratio which is a value in the range of from 0.45 to 0.7, b is a mol ratio which is a value in the range of from 0.3 to 0.55, and x is a value in the range of from 0.1 to 1.0 except the case where a is 0.5 and b is 0.5, or x is a value in the range of from 0 to 1.0 when a is 0.5 and b is 0.5.

This amorphous substance is used as a solid electrolyte of an electrochromic display device or the like.

12 Claims, 6 Drawing Figures

AMORPHOUS LITHIUM FLUOALUMINATE

BACKGROUND OF THE INVENTION (1) Field of the Invention

The present invention relates to an amorphous lithium fluoaluminate and a solid electrolyte including this amorphous substance. More particularly, the present invention relates to an amorphous substance and solid electrolyte for use in the production of electrochromic display devices and lithium batteries.

(2) Description of the Prior Art

In order to make an all solid state electrochromic display device or the like, it is necessary to use a solid substance which has a lithium ion conductivity $\sigma_{25}$ of at least $1 \times 10^{-6}$ $(\Omega\text{-cm})^{-1}$ at room temperature (25° C.) and is stable in air and which can easily be formed into a solid film having a thickness of 1 to 10 μm. As the substance satisfying these requirements, there have been proposed and examined $Li_xNa_{1-x}/\beta$-alumina and $Li_3N$ as disclosed in Japanese Patent Application Laid-Open Specification No. 43505/80. However, the former substance is defective in that formation of a film is difficult, and the latter substance is defective in that it is not stable in air. In addition, films of $RbAg_4I_5$, LiF, $MgF_2$ and $Cr_2O_3$ have been proposed. However, these films are defective in that the time required for coloration and bleaching is very long (longer than 1 minute), they are significantly influenced by the atmosphere, the reproducibility is poor, they have no memory action and the life is short.

SUMMARY OF THE INVENTION

It is a primary object of the present invention to provide an amorphous substance having a high ionic conductivity.

Another object of the present invention is to provide a solid electrolyte for an electrochromic display device or the like.

In accordance with the present invention, these and other objects can be attained by an amorphous substance represented by the following general formula:

$$aLi_xNa_{1-x}F.bAlF_3$$

wherein a is a mol ratio which is a value in the range of from 0.45 to 0.7, b is a mol ratio which is a value in the range of from 0.3 to 0.55, and x is a value in the range of from 0.1 to 1.0 except the case where a is 0.5 and b is 0.5, or x is a value in the range of from 0 to 1.0 when a is 0.5 and b is 0.5.

BRIEF DESCRIPTION OF THE DRAWINGS

FIG. 1-(b) is an equilibrium phase diagram of the NaF-AlF$_3$ system.

FIG. 1-(c) is an equilibrium phase diagram of the Kf-AlF$_3$ system.

DETAILED DESCRIPTION OF THE PREFERRED EMBODIMENTS

Before the present invention is described in detail, equilibrium phases appearing in the MF-AlF$_3$ system (M is Li, Na or K) will first be described with reference to equilibrium phase diagrams of FIGS. 1-(a), 1-(b) and 1-(c).

Figure 1A:
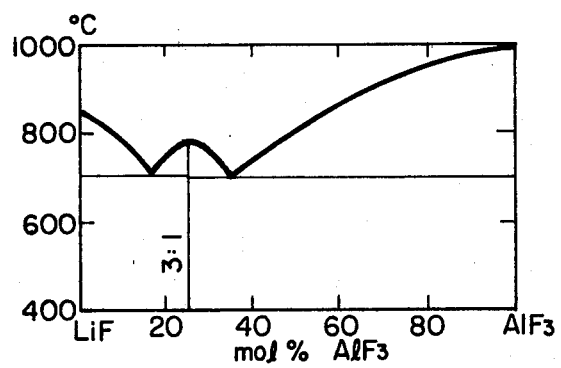
FIG. 1-(a) is an equilibrium phase diagram of the LiF-AlF$_3$ system.
Figure 1B:
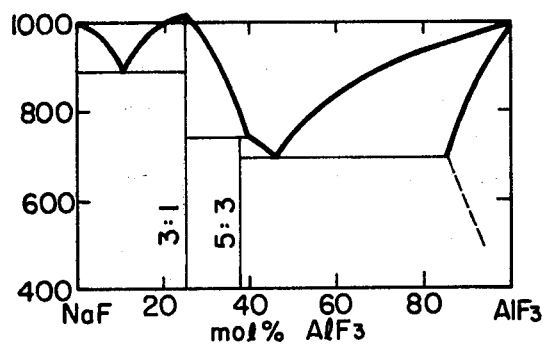
Figure 1C:
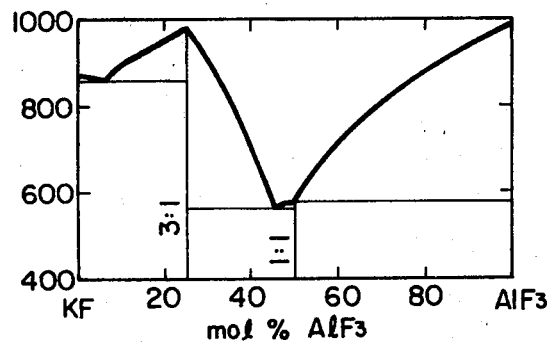

(1) In the LiF-AlF$_3$ system, only Li$_3$AlF$_6$ (corresponding to 3LiF.AlF$_3$) is present as a stable compound [see FIG. 1-(a)].

(2) In the NaF-AlF$_3$ system, Na$_3$AlF$_6$ (corresponding to 3NaF.AlF$_3$) and Na$_5$Al$_3$F$_{14}$ (corresponding to 5-NaF.3AlF$_3$) are present as stable compounds [see FIG. 1-(b)].

(3) In the KF-AlF$_3$ system, K$_3$AlF$_6$ (corresponding to 3KF.AlF$_3$) and KAlF$_4$ (corresponding to KF.AlF$_3$) are present as stable compounds [see FIG. 1-(c)].

In connection with M$_5$Al$_3$F$_{14}$ crystals which are not present in the LiF-AlF$_3$ system but present in the NaF-AlF$_3$, we examined whether or not non-equilibrium phase or amorphous Li$_5$Al$_3$F$_{14}$ would be present and whether or not the lithium ion conductivity would be high. As the result, it was found that compounds and amorphous substances having compositions shown in Examples given hereinafter could be obtained and these amorphous substances had such a high lithium ion conductivity as $10^{-5}$ $(\Omega\text{-cm})^{-1}$.

The reason why non-equilibrium or amorphous Li$_5$Al$_3$F$_{14}$ compounds have a high lithium ion conductivity will now be described from the viewpoint of crystal chemistry.

Figure 2:
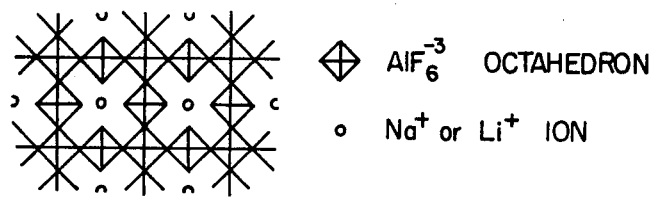
FIG. 2 is a diagram showing the fictitious structures of Na$_5$Al$_3$F$_{14}$ crystal and Li$_5$Al$_3$F$_{14}$ crystal.

Six F$^-$ ions coordinate around one Al$^{---}$ ion to form an octahedral structure, and this AlF$_6^{---}$ octahedron is a basic structural unit constituting a crystal. The Na$_5$Al$_3$F$_{14}$ crystal which has a stable phase takes a cubic structure in which four tops of this octahedron are coowned and the remaining spaces are filled with Na$^+$ ions (see FIG. 2).

When a substance having the composition of Li$_5$Al$_3$F$_{14}$ is molten or evaporated, since the LiAlF$_4$ molecule is present stably, a mixture of LiF molecules and LiAlF$_4$ molecules will be formed according to the following reaction:

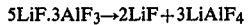
$$5LiF.3AlF_3 \rightarrow 2LiF + 3LiAlF_4$$

When this mixture is condensed to a solid, because of the demands of the chemical bond theory, (a) the Al-F-Li bond will be conserved and (b) the AlF$_6^{---}$ octahedron will be formed. In the thermal equilibrium, the mixture will be separated into two phases of Li$_3$AlF$_6$ and AlF$_3$ according to the following reaction:

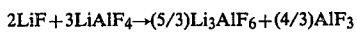
$$2LiF + 3LiAlF_4 \rightarrow (5/3)Li_3AlF_6 + (4/3)AlF_3$$

However, in order for this two-phase separation to take place, it is necessary that (c) cutting of the Al-F-Li bond and (d) growth of Li$_3$AlF$_6$ crystal and AlF$_3$ crystal by long range diffusion of molecules should occur.

Supposing that the following reaction takes place:

$$2LiF + 3LiAlF_4 \rightarrow Li_5Al_3F_{14}$$

the elementary process is only (e) annexation of the LiF molecule to the LiAlF$_4$ molecule, and therefore, cutting of the Al-F-Li bond which is inherently stable or long range diffusion of molecules need not be effected. Accordingly, it is considered that if a melt or vapor of a substance having the composition of 5LiF.3AlF$_3$ is rapidly cooled and solidified, non-equilibrium or amorphous Li$_5$Al$_3$F$_{14}$ will be formed.

Not only such non-equilibrium or amorphous Li$_5$Al$_3$F$_{14}$ compound (corresponding to 5LiF.3AlF$_3$) but also amorphous 5Li$_x$Na$_{1-x}$F.3AlF$_3$ compound ($0.1 \leq x \leq 1.0$) in which a part of LiF in the above non-equilibrium or amorphous compound is replaced by NaF is present in the amorphous form.

Substances of MAlF$_4$ and analogous substances will now be described from the viewpoint of crystal chemistry.

(1) A substance in which M is Li or Na is not present as the thermal equilibrium phase.

(2) A substance is which M is K is present as the thermal equilibrium phase, as pointed out hereinbefore with reference to FIG. 1-(c), and a substance in which M is Rb, Cs, Tl or NH$_4$ is present as the thermal equilibrium phase. In such substance, six F atoms coordinate around one Al atom to form an octahedral structure. The substance has a structure in which layers consisting solely of this octahedral structure and layers consisting solely of a monovalent ion are alternatingly laminated. The unit cell belongs to the cubic system.

(3) The above-mentioned structure is a layered structure like that of β-alumina or Li$_3$N, and it was once expected that the monovalent ion would have an ionic conductivity. However, the value $\sigma_{25}$ actually measured with respect to KAlF$_4$ is lower than $10^{-10}$ (Ω-cm)$^{-1}$, and KAlF$_4$ is not worth being called "ionic conductor". A substance in which M is a larger monovalent ion, such as Rb, Cs, Tl or NH$_4$, is expected to have a lower ionic conductivity.

(4) A molecule in which M is Li is present stably in the gas phase.

(5) When a molecule in which M is Li is condensed from the gas phase, a quasi-equilibrium solid phase in which M is Li is obtained in the form of a crystal or powder.

(6) When a liquid phase having a composition in which M is Na is rapidly cooled, a quasi-equilibrium solid phase in which M is Na is obtained in the form of a crystal or powder.

(7) A quasi-equilibrium phase crystal in which M is Li or Na has a structure similar to the structure in which M is K, Rb or the like.

(8) The lattice constant of a quasi-equilibrium phase crystal in which M is Li or Na is equal to the lattice constant of the crystal in which M is K, Rb or the like. However, the ion radius of Li or Na is smaller than the ion radius of K, Rb or the like. Accordingly, it is theoretically expected that the mobility of the Li or Na ion in such quasi-equilibrium crystal is larger. However, the value of this mobility has not practically been measured.

(9) A substance in which Al is replaced by other trivalent ion, for example, Y, Yb or Eu, and M is Li or Na is present as the thermal equilibrium phase. However, the ionic conductivity of such substance has not been known.

(10) A substance in which F is replaced by other halogen, such as Cl, and M is Li or Na is present as the thermal equilibrium phase, and the ionic conductivity $\sigma_{25}$ of such substance is as high as $1 \times 10^{-6}$ (Ω-cm)$^{-1}$.

However, such tetrachloride is highly hygroscopic and it cannot be present stably in air.

As will be apparent from the foregoing description, a quasi-equilibrium phase crystal of MAlF$_4$ in which M is Li or Na can be obtained, and it is expected that if this crystal has a definite dimension, the ionic conductivity of this crystal can be measured and industrial applications of this crystal will be developed. It may be considered that this object will be attained by sintering powders obtained by the methods described in (5) and (6) above to form ceramics. However, at the sintering step, the powders of the quasi-equilibrium phase are decomposed to a stable phase by the following reaction:

$$3MAlF_4 \rightarrow M_3AlF_6 + 2AlF_3$$

Therefore, it is practically impossible to obtain a quasi-equilibrium phase sintered body.

In view of the foregoing, it may be concluded that realization of a lithium ion or sodium ion conductor having a structure of MAlF$_4$ would be impossible. The present invention is characterized in that this conductor can practically be provided as described hereinafter. Before the present invention is described in detail with reference to Examples, the theoretical ground for realization of formation of this novel substance will be described from the viewpoint of the chemical bond theory.

As is well-known, Li and F are crystallized to an NaCl type structure where six foreign atoms coordinate with each other according to relations of the mutual ion bonding property, the ion radius ratio and the ion valency. Similarly, Al and 3F are crystallized to a perovskite structure (strictly speaking, deformed perovskite structure) in which six F atoms coordinate with Al in the octahedral from and two Al atoms coordinate with F, namely, the respective tops of the octahedron are coowned by Al and F. This octahedral structure expendiently expressed as AlF$_6^{---}$ is very stable and is a basic unit constituting a crystal of a compound containing Al and F. In contrast, the fundamental form of bonding of Li and F is not always the NaCl type six-coordinate form. This difference of the coordination with F between Al and Li is due to the fact that the covalent nature of the Al-F bond is more conspicuous than that of the Li-F bond. It may be said that this AlF$_6^{---}$ octahedron has crystal-chemical characters similar to those of the SiO$_4^{----}$ tetrahedron, the AlO$_6^{-----}$ octahedron and the WO$_6^{------}$ octahedron.

As described in (4) above, it is known that when a substance having a composition of LiF.AlF$_3$ is evaporated, a molecule of LiAlF$_4$ is stably present in the gas. This fact, however, is not obvious if it is taken into account that the LiAlF$_4$ molecule contains two ions having a low electronegativity (Li$^+$ and Al$^{+++}$) and the electrostatic repulsive force between these ions is extremely large. This fact will not be explained reasonably unless it is presumed that any Al-F-Li bond having a covalent nature will be stably present. Furthermore, as pointed out hereinbefore, the Al-F bond tends to have a structure in which F atoms coordinate around the Al atom, though in case of the LiAlF$_4$ molecule, the coordination number is not 6 providing a stable structure but is 4. Therefore, it is considered that the LiAlF$_4$ molecule will have the following structure:

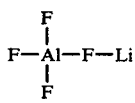

Condensation of a gas or liquid (the molecule which is stably present even in the gas should naturally be stably present in the liquid) consisting of the LiAlF$_4$ molecule which is considered to have a directional order due to the covalent bond, to a solid will now be discussed. At this time, because of demands of the chemical bonding theory, in the solid phase, (a) the Al-F-Li bond will be conserved and (b) the AlF$_6^{---}$ octahedron will be formed. The equilibrium phase diagram experimentally demonstrates that a crystal of LiAlF$_4$ is not present but the solid is always separated in two phases of Li$_3$AlF$_6$ and AlF$_3$. (This is due to the fact that since the ion radius of Li is too small, a fictitious LiAlF$_4$ crystal cannot be stably present, and in fact, MAlF$_4$ crystals in which M is K, Rb or Cs which has a small electronegativity comparable to that of Li but has a larger ion radius than that of Li is stably present.) In the separated two phases, Li$_3$AlF$_6$ satisfies the above conditions (a) and (b) and AlF$_3$ free of Li satisfies the above condition (b).

In order for separation into the two phases to take place, it is necessary that (c) cutting of the Al-F-Li bond and (d) growth of Li$_3$AlF$_6$ crystal and AlF$_3$ crystal by long range diffusion of molecules should take place. Each of (c) and (d) is a thermally activated process. Needless to say, the state obtained by sufficient progress of these processes is the above-mentioned two-phase separation state and it is the equilibrium phase diagram which illustrates this state. It will now be discussed what state will be obtained in the thermally activated processes (c) and (d) are sufficiently advanced. At this time, since the Al-F-Li bond is inherently stable, this bond will tend to conserve the original state, whereas a molecule rotation and a half molecule length progress will be given to the Al-F bond in minimum quantities necessary for taking a most stable 6-coordination structure in the solid at ratios corresponding to the given time. It will be understood that one state of the so-formed solid is the non-equilibrium LiAlF$_4$ (or NaAlF$_4$) crystal described in (5) and (6) above. Furthermore, there is a fair possibility that the above-mentioned minimum thermally activated process will guarantee only a short range ordering in forming the network of the AlF$_6^{---}$ octahedral structure. In other words, although among 6 tops of the regular octahedron, the four tops should be coowned by F atoms of other regular octahedron to realize a regular crystallinity, there actually appear tops not coowned or ridges are coowned, or there may be brought about a state where such coownership relations are mixed. In such state, no long range ordering is present in the atom arrangement any more, and therefore, the state is observed as an amorphous structure in the X-ray diffractometry.

In short, when a gas or liquid consisting of molecules of LiAlF$_4$ is rapidly cooled to a solid, there is obtained an amorphous substance which has a non-equilibrium LiAlF$_4$ crystal or LiAlF$_4$ crystal only in the state having a short range ordering.

The amorphous substance of the present invention is an amorphous substance represented by the above-mentioned formula 5Li$_x$Na$_{1-x}$F.3AlF$_3$ (in which x is a value in the range of 0.1≦x≦1.0), an amorphous substance represented by the formula Li$_x$Na$_{1-x}$AlF$_4$ (in which x is a value in the range of 0≦x≦1.0) or a mixture of these amorphous substances. More specifically, in accordance with the present invention, there is provided an amorphous substance represented by the following general formula:

$$aLi_xNa_{1-x}F.bAlF_3$$

wherein a is a mol ratio which is a value in the range of from 0.45 to 0.7, b is a mol ratio which is a value in the range of from 0.3 to 0.55, and x is a value in the range of from 0.1 to 1.0 except the case where a is 0.5 and b is 0.5, or x is a value in the range of from 0 to 1.0 when a is 0.5 and b is 0.5.

The amorphous substance of the present invention further includes a mixture of compounds represented by the above general formula and a mixture of LiF, NaF and AlF$_3$ which has a composition included in the scope defined by the above general formula.

As is seen from Examples given hereinbelow, in the amorphous substance of the present invention, each of amounts of Li, Na and F may be outside the stoichiometric composition by about ±20%.

The amorphous substance of the present invention has an excellent electrical conductivity and can be used as a solid electrolyte. The electrical conductivity is especially excellent when x is in the range of 0.5≦x≦1.0.

The amorphous substance of the present invention can be prepared, for example, by rapidly cooling a melt or gas having the above composition, and a vacuum evaporation deposition method, for example, may be adopted.

The present invention will now be described in detail with reference to the following Examples that by no means limit the scope of the present invention.

EXAMPLE 1

A powder of a stoichiometric composition of LiF and AlF$_3$ was charged in an evaporation boat made of tungsten, and the charge was evaporated by resistance heating in a vacuum evaporation apparatus to deposit a solid on a substrate. The degree of vacuum was 1 to 5 mPa and the boat temperature was 700° to 1000° C. As the substrate, there was used a slide glass or an ITO-coated (indium-tin oxide-coated) slide glass, and the substrate was maintained at room temperature. The deposition speed was adjusted to 10 to 100 nm/min. The so-formed deposit was a colorless and transparent film firmly adhering to the substrate. In the X-ray diffraction diagram of the film, no peak was observed, and it was confirmed that the film was amorphous. When the film was subjected to chemical analysis, it was found that the film had an average composition of Li$_{1.2}$AlF$_{4.2}$.

An Li-Al alloy film electrode was deposited on the film of the present invention thus formed on the ITO coating according to the vacuum evaporation deposition method, and when a DC field of less than 3 V was applied between ITO and Li-Al, the electric conductivity of 0.5×10$^{-5}$ to 2×10$^{-5}$ (Ω-cm)$^{-1}$ was observed at room temperature only if Li$^+$ ions were deemed to move stationarily in the film. Accordingly, it was judged that this film was a lithium ion conductor having the above electric conductivity.

By changing the mixing ratio of the starting materials to be evaporated, there was obtained evaporation deposition products in which the LiF/AlF$_3$ molar ratio was such that x was 1 or in the range of from 0.8 to 1.2. Each of these products had a lithium ion conductivity.

EXAMPLE 2

The experiment was carried out in the same manner as described in Example 1 except that the substrate temperature was changed to 300° C. The obtained vacuum evaporation film consisted of a non-equilibrium LiAlF$_4$ crystal and had a thickness of 1.0 μm. It was found that this film had a lithium ion conductivity of $2 \times 10^{-5}$ (Ω-cm)$^{-1}$.

EXAMPLE 3

A powder of a stoichiometric composition of LiF and AlF$_3$ was charged in a Pt crucible having a small hole of $0.2 \times 5$ mm$^2$ on the bottom, and the powder was heated and molten at 930° C. in an argon atmosphere by the high frequency heating method. The melt was ejected from the small hole on the bottom of the crucible by the argon gas pressure and let to fall down on a rotating roll made of Cu to rapidly cool the melt. A ribbon having a width of 5 mm and a thickness of 15 to 30 μm was obtained. No peak was observed in the X-ray diffraction diagram of the ribbon, and it was confirmed that the ribbon was amorphous.

Li-Al alloy vacuum evaporation film electrodes were formed on both the surfaces of the ribbon, and the DC conductivity was examined. It was found that the electric conductivity was $1 \times 10^{-5}$ (Ω-cm)$^{-1}$ at room temperature. Cr-Au laminate vacuum evaporation film electrodes were formed on both the surfaces of the ribbon and the AC conductivity was measured at 1 KHz. It was found that the electric conductivity was $1 \times 10^{-5}$ (Ω-cm)$^{-1}$. Thus, it was confirmed that this amorphous ribbon was a lithium ion conductor having a composition corresponding to LiAlF$_4$.

EXAMPLE 4

A vacuum evaporation film having a thickness of 1.0 μm was obtained from a starting material of a stoichiometric composition of NaF and AlF$_3$ in the same manner as described in Example 1. No peak was observed in the X-ray diffraction diagram of the film, and it was confirmed that the film was amorphous. From the results of chemical analysis, it was found that the film had an average composition of Na$_{1.1}$AlF$_{4.1}$. The Na ion conductivity of the film at room temperature was $0.8 \times 10^{-5}$ (Ω-cm)$^{-1}$.

EXAMPLE 5

A vacuum evaporation film having a thickness of 1.0 μm was prepared from a mixture containing LiF, NaF and AlF$_3$ at a molar ratio of 0.5/0.5/1 in the same manner as described in Examples 1 and 4. No peak was observed in the X-ray diffraction diagram of the film, and it was confirmed that the film was amorphous. From the results of chemical analysis, it was found that the film had an average composition of Li$_{0.6}$Na$_{0.5}$AlF$_{4.1}$. The ionic conductivity of the film was $0.5 \times 10^{-5}$ (Ω-cm)$^{-1}$ at room temperature.

EXAMPLE 6

A powder of a mixture containing LiF and AlF$_3$ at a molar ratio of 5/3 was vacuum-evaporated to form a film. The degree of vacuum was 1 to 5 mPa and the boat temperature was 700° to 1000° C. The vacuum evaporation speed was adjusted to 10 to 100 nm/min and the substrate temperature was room temperature or 200° C. As the substrate, there was used a slide glass or an ITO-coated (indium-tin oxide-coated) slide glass. The so formed film having a thickness of 1.0 μm was colorless and transparent and adhered firmly to the substrate. No peak was observed in the X-ray diffraction diagram of the film, and it was confirmed that the film was amorphous. From the results of chemical analysis, it was found that the film had an average composition of Li$_{5.5}$Al$_{3.0}$F$_{14.5}$.

Namely, this amorphous substance corresponded to 5.5LiF.3AlF$_3$, and the molar ratio of AlF$_3$ of this amorphous substance in the LiF.AlF$_3$ system was expressed as 35.3 mol % AlF$_3$.

A Li-Al alloy film electrode was vacuum-evaporated on the film deposited on the ITO coating, and a DC field of less than 3 V was applied between ITO and Li-Al alloy. The electric conductivity of $2 \times 10^{-5}$ (Ω-cm)$^{-1}$ was measured at room temperature (25° C.) only when Li$^+$ ions were deemed to move stationarily in the film. Accordingly, it was judged that the film was a lithium ion conductor having the above electric conductivity.

EXAMPLE 7

Figure 3:
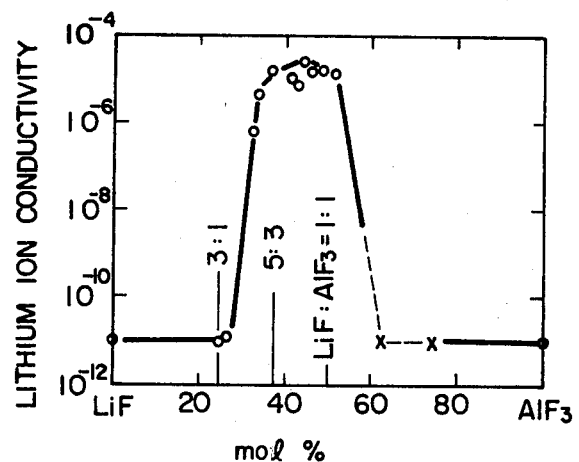
FIG. 3 is a diagram illustrating the relation between the mol % of AlF$_3$ and the lithium ion conductivity in a synthesized LiF-AlF$_3$ system non-equilibrium compound.

The experiment described in Example 6 was carried out while the LiF/AlF$_3$ molar ratio was changed to obtain the results shown in FIG. 3. From the results shown in FIG. 3, it is seen that when the above molar ratio is 5/3 or 1/1, a high lithium ion conductivity is obtained. In an amorphous film having a composition intermediate between the above two molar ratios, a similarly high lithium ion conductivity can be obtained. It is considered that the reason is that each of substances having such intermediate composition is a mixture of compounds having a high ionic conductivity. On the other hand, an amorphous film in which the proportion of LiF is increased so that the above molar ratio is 3/1 (corresponding to stable phase Li$_3$AlF$_6$), like a single substance of LiF, has no ionic conductivity. On the other hand, in a film in which the proportion of AlF$_3$ is higher than the molar ratio of 1/1, cracking or peeling is conspicuous, and the measurement of the lithium ion conductivity is therefore impossible. Of course, this film cannot be put into practical use. Although such macroscopic defect is observed in a film of a single substance of AlF$_3$, the film has not any lithium ion conductivity at all.

EXAMPLE 8

The experiment was carried out in the same manner as described in Example 6 except that ½ of LiF was replaced by NaF. An amorphous substance having a composition of Li$_{2.75}$Na$_{2.75}$Al$_{3.0}$F$_{14.5}$ was obtained. It was found that the lithium ion conductivity of this amorphous substance was $1 \times 10^{-5}$ (Ω-cm)$^{-1}$.

EXAMPLE 9

A powder of a mixture containing LiF and AlF$_3$ at a molar ratio of 5/3 was charged in a Pt crucible having a small hole of $0.2 \times 5$ mm$^2$ on the bottom, and the powder was heated and molten at 800° C. in an argon atmosphere by the high frequency heating method. Then, the melt was ejected from the small hole on the bottom of the crucible by the argon gas pressure and was let to fall down on a rotating roll made of Cu to rapidly cool the melt. A ribbon having a width of 5 mm and a thickness of about 30 μm was obtained. From the results of X-ray diffractometry, it was found that the ribbon had an amorphous structure.

Li-Al or Cr-Au electrodes were vacuum-evaporated on both the surfaces of the ribbon, and the DC conductivity and AC conductivity were measured. It was found that the lithium ion conductivity of the ribbon was $1\times10^{-5}$ $(\Omega\text{-cm})^{-1}$.

EXAMPLE 10

A film was prepared by vacuum evaporation of a mixture containing LiF and AlF$_3$ at a molar ratio of 6/3 (=2/1). From the results of chemical analysis, it was found that the average composition of the film was Li$_{6.5}$Al$_{3.0}$F$_{15.5}$. It was found that the ionic conductivity (regarded as the lithium ion conductivity) of the film was $1\times10^{-5}$ $(\Omega\text{-cm})^{-1}$ at room temperature.

This substance can be regarded not only as a substance intermediate between Li$_5$Al$_3$F$_{14}$ and Li$_3$AlF$_6$ but also as a substance intermediate between Li$_2$AlF$_5$ and Li$_3$AlF$_6$. Of course, Li$_2$AlF$_5$ is not present as the equilibrium phase in the LiF-AlF$_3$ equilibrium phase diagram, and even if Li is replaced by Na or K, no stable phase appears. Only if Li is replaced by Tl, a stable phase appears. The substance has a one-dimensional chain structure in which 2 tops of the AlF$_6{}^{---}$ octahedron are coowned.

EXAMPLE 11

An embodiment in which the amorphous substance of the present invention is used for an electrochromic display device is illustrated in this Example.

Figure 4:
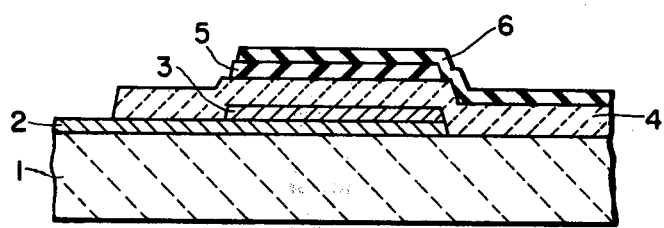
FIG. 4 is a sectional view showing one embodiment of an electrochromic display device including the amorphous substance of the present invention.

The structure and preparation process of an electrochromic display device will now be described with reference to the sectional diagram of FIG. 4.

A transparent electrode 2 (consisting of indium-tin oxide and having a thickness of 0.2 μm) is coated on a glass substrate 1, and the electrode 2 is worked by photoetching to give a desired plane configuration. Then, a display electrode 3 (consisting of a tungsten oxide vacuum evaporation film and having a thickness of 0.3 μm) having a desired plane configuration is formed on the worked transparent electrode 2. A LiAlF$_4$ vacuum evaporation film 4 is deposited to cover the entire surface. The vacuum evaporation deposition is accomplished by mixing LiF powder with AlF$_3$ powder at a molar ratio of 1/1, charging the mixture in a tungsten boat and heating the boat at 700° to 1000° C. to effect evaporation. The substrate temperature is room temperature, the deposition speed is 30 nm/min and the film thickness is 1.0 μm. Then, a counterelectrode 5 is formed. This counterelectrode 5 consists of a vacuum evaporation film of LiAl. The counterelectrode 5 is formed by the mask deposition method so that only the display electrode 3 is covered by the counterelectrode 5. The film thickness of the counterelectrode was 0.5 μm. Then, an electrode 6 is further formed to connect the counterelectrode 5 with an outer electrode. The electrode 6 consists of a vacuum evaporation film of Al having a thickness of 0.5 μm and is prepared by the mask deposition method so that a desired configuration is given to the electrode 6. The transparent electrode 2 and electrode 6 are not faced to each other in the area other than the area where the display electrode is disposed. By adoption of this arrangement, unexpected and unnecessary electronic conduction can be reduced to a minimum level.

The resulting element is sealed in an appropriate package (not shown) to prevent the element from receiving mechanical and chemical damages. The main operation characteristics of the so obtained all solid state electrochromic display device at room temperature are as follows.

Color: dark blue/silver white
Reflection ratio: 50%/100%
Response time for coloration of bleaching: 5 seconds
Voltage: 5 V
Charge consumption: 12 mC/cm$^2$
Memory period: 100 hours Similar electrochromic display devices can be prepared from amorphous substances having compositions shown in Examples 1 through 10 can be prepared according to the above-mentioned method.

What is claimed is:

1. An amorphous substance represented by the following general formula:

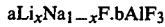
$$aLi_xNa_{1-x}F \cdot bAlF_3$$

wherein a is a mol ratio which is a value in the range of from 0.45 to 0.7, b is a mol ratio which is a value in the range of from 0.3 to 0.55, and x is a value in the range of from 0.1 to 1.0 except the case where a is 0.5 and b is 0.5, or x is a value in the range of from 0 to 1.0 when a is 0.5 and b is 0.5.

2. An amorphous substance as set forth in claim 1, wherein in said general formula, a is a molar ratio which is a value of from 0.50 to 0.70 and b is a molar ratio which is a value of from 0.3 to 0.50.

3. An amorphous substance as set forth in claim 1, wherein in said general formula, x is a value in the range of from 0.5 to 1.0.

4. An amorphous substance as set forth in claim 1, wherein in said general formula, x is a value of 1.

5. An amorphous substance as set forth in claim 1, which is a non-equilibrium Li$_5$Al$_3$F$_{14}$ compound.

6. An amorphous substance as set forth in claim 1, which is represented by the following formula:

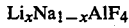
$$Li_xNa_{1-x}AlF_4$$

wherein x is a value in the range of from 0 to 1.

7. An amorphous substance as set forth in claim 6, wherein in said general formula, x is 1.

8. An amorphous substance as set forth in claim 6, wherein in said general formula, x is 0.

9. A solid electrolyte comprising an amorphous substance presented by the following general formula:

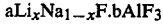
$$aLi_xNa_{1-x}F \cdot bAlF_3$$

wherein a is a mol ratio which is a value in the range of from 0.45 to 0.7, b is a mol ratio which is a value in the range of from 0.3 to 0.55, and x is a value in the range of from 0.1 to 1.0 except the case where a is 0.5 and b is 0.5, or x is a value in the range of from 0 to 1.0 when a is 0.5 and b is 0.5.

10. A solid electrolyte as set forth in claim 9, wherein in said general formula, a is a molar ratio which is a value in the range of from 0.50 to 0.70 and b is a molar ratio which is a value in the range of from 0.3 to 0.5.

11. A solid electrolyte as set forth in claim 9 or 10, wherein in said general formula, x is a value in the range of from 0.5 to 1.0.

12. A solid electrolyte as set forth in claim 9 or 10, wherein in said general formula, x is 1.

* * * * *